US008423465B1

(12) United States Patent
McGraw, IV et al.

(10) Patent No.: US 8,423,465 B1
(45) Date of Patent: Apr. 16, 2013

(54) ADAPTIVE DIAGNOSTICS FOR AUTOMATED TELLER MACHINE("ATM") FAULT CONDITIONS

(75) Inventors: William H. McGraw, IV, Charlotte, NC (US); Nathan Dent, Charlotte, NC (US); Timothy B. Vannatter, Charlotte, NC (US); Matthew K. Bryant, Gastonia, NC (US)

(73) Assignee: Bank of America Corporation, Charlotte, NC (US)

( * ) Notice: Subject to any disclaimer, the term of this patent is extended or adjusted under 35 U.S.C. 154(b) by 422 days.

(21) Appl. No.: 12/726,384

(22) Filed: Mar. 18, 2010

(51) Int. Cl.
*G06Q 40/00* (2012.01)

(52) U.S. Cl.
USPC .......... 705/43

(58) Field of Classification Search .......... 705/43
See application file for complete search history.

(56) References Cited

U.S. PATENT DOCUMENTS

| | | | | |
|---|---|---|---|---|
| 5,984,178 | A * | 11/1999 | Gill et al. | 235/379 |
| 6,437,692 | B1 | 8/2002 | Petite et al. | |
| 6,594,666 | B1 | 7/2003 | Biswas et al. | |
| 6,976,622 | B1 | 12/2005 | Trelawney et al. | |
| 7,053,767 | B2 | 5/2006 | Petite et al. | |
| 7,163,144 | B1 * | 1/2007 | Trelawney et al. | 235/379 |
| 7,295,993 | B1 * | 11/2007 | Meek et al. | 705/16 |
| 2002/0125998 | A1 | 9/2002 | Petite et al. | |
| 2006/0181406 | A1 | 8/2006 | Petite et al. | |
| 2008/0121692 | A1 * | 5/2008 | MacPhail et al. | 235/379 |

FOREIGN PATENT DOCUMENTS

| | | |
|---|---|---|
| EP | 961246 | 10/2008 |
| WO | WO 01/35190 | 5/2001 |
| WO | WO 2004/044800 | 5/2004 |

OTHER PUBLICATIONS http://www.ncr.com/documents/aptra_advance_ndc_uk_ds.pdf retrieved on Feb. 1, 2010.

http://www.gasper-corp.com/Solution_Exchange.asp retrieved on Feb. 1, 2010.

http://www.aciworldwide.com/igsbase/igstemplate.cfm/SRC=MD021/SRCN=lookupdetails/GnavID=103/SnavID=/TnavID=/LookupCatID=30/CATsearch=1 Retreived on Feb. 1, 2010.

* cited by examiner

*Primary Examiner* — Jessica Lemieux

(74) *Attorney, Agent, or Firm* — Weiss & Arons LLP; Michael Springs

(57) ABSTRACT

Thus, methods and apparatus for providing adaptive diagnostics for ATM fault conditions are provided. Such methods and apparatus may include one or more computer-readable media storing computer-executable instructions which, when executed by a processor on a computer system, perform a method for diagnosing an electronic self-service device fault condition. The method may include receiving an input from a self-service device. The input may include information regarding a fault-related event. The method may also include assessing a plurality of system-level ramifications of the fault-related event. In response to the assessing, the method may further include determining continued viability of a plurality of ATM services. The method may also include electronically providing a notification of a list of remaining viable self-service device services.

14 Claims, 9 Drawing Sheets

ADAPTIVE DIAGNOSTICS FOR AUTOMATED TELLER MACHINE("ATM") FAULT CONDITIONS

FIELD OF TECHNOLOGY

This invention relates to self-service devices. More specifically, this invention relates to the field of Automatic Teller Machines (ATM).

BACKGROUND OF THE INVENTION

The following is one exemplary scenario of a common problem associated with ATMs. ATM users routinely utilize an ATM to perform transactions—e.g., the withdrawal of cash prior to attending another engagement. An ATM user often travels to an ATM. Traveling to and from the ATM, especially when one is not located in a familiar area, may be inconvenient. Moreover, the banking transactions desired by the user are often time-critical. When a user travels to an ATM and the ATM cannot provide the service needed by the user, the failed trip to the ATM may result in economic loss, as well as other lost resources.

Therefore, it would be desirable to provide systems for use within an out of service ATM that direct a user to the nearest working ATM. In another scenario, the ATM may suffer a fault and it would be desirable to direct the ATM user to an alternate ATM by the most efficient route.

In yet another scenario, it would be desirable to provide the ATM user with a map showing "coverage" which indicates the travel time to a set of proximate ATMs.

It would be further desirable to provide adaptive diagnostics for use in diagnosing ATM fault conditions, generally.

It would be yet further desirable to provide solutions based at least in part on the diagnosis of the fault conditions.

SUMMARY OF THE INVENTION

Methods and apparatus according to the invention are directed to adaptive diagnostics for use in diagnosing ATM fault conditions.

In yet another embodiment of the invention the ATM may provide a fault management system. In such an embodiment, the systems and methods according to the invention may assess a fault condition, and determine which aspects of the ATM remain viable. For example, the ATM may lose contact with the network, run out of cash or develop some other fault. Following assessment of the fault, the ATM may continue to provide certain thin-client mode services. Preferably, when the ATM is unable to provide user service it may direct the user to an alternate ATM.

In yet another embodiment of the invention the ATM may provide a "coverage" map showing directions and estimated travel time to preferably user-selectable alternate ATM locations.

In one embodiment of the invention an ATM may be part of a network connected to ATM software. Upon receiving indication of an ATM fault condition, the ATM software may provide the option of requesting travel directions to a known ATM location or to the closest ATM location. The ATM software may provide the travel directions. The location of the user may be provided by use of a reverse-lookup directory of a phone number or by some other suitable manner.

In an alternative embodiment, the ATM network may be configured to connect to a user handheld communication device—e.g., a cell phone or a Personal Digital Assistant ("PDA")—via software or a downloaded PDA application. In such an embodiment, the ATM may provide instructions via the network to the PDA.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
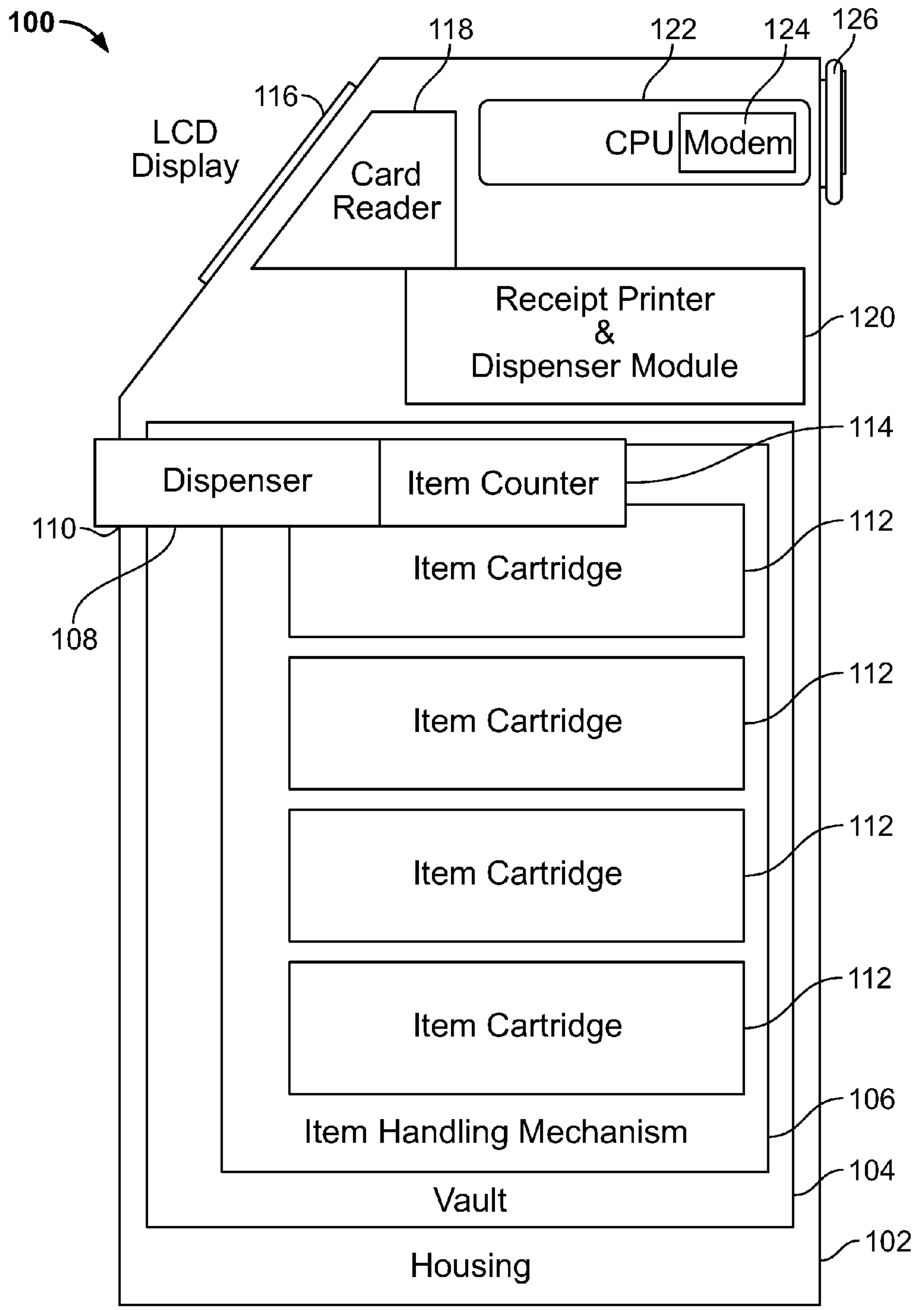
FIG. 1 shows a schematic diagram of an apparatus for use according to the principles of the invention.

Systems, methods and apparatus according to the invention preferably provide enhanced ATM functionality. Such enhanced functionality includes providing helpful user information in the event of failure at an ATM terminal. Such systems, methods and apparatus preferably mitigate dissatisfaction associated with a broken ATM.

Certain embodiments of the invention provide the following services in the event of ATM or ATM component failure. Such systems, methods and apparatus may be used to enable the display of helpful user information via a web page served by a web server remote from the ATM. Such an embodiment may transform the ATM into a functional thin-client station—i.e., a limited resource computer—until the ATM is fully operable.

Modes of operation of the invention may include one or more modes defined by the ATM fault condition. There are a variety of reasons why an ATM can enter a fault condition. Conventional ATMs may be operable in a fault condition to provide a simple and static "out of service" message on the consumer display.

A "thin-client mode"-enabled ATM according to the invention may launch a web page served by a web server remote from the upon detection of the out of service condition. This web page may be displayed on the ATM display. Such information may include providing an accessible on-line portal for allowing a user to access his or her on-line banking portal.

The web server according to the invention could further serve location-specific information based on the geo-spatial data available for that ATM. Key information to display could include, but not be limited to, the following:

TABLE 1

| Key Information to Display in Response to ATM Fault Condition Information to Display |
|---|
| Location of nearby ATMs;<br>Location of nearby Banking Centers;<br>Location of nearby Bank-affiliated Retail Point of Sale terminals;<br>Estimated Time for Repair of that ATM, based at least in part on information relating to the cause for ATM failure;<br>Advertisements; and/or<br>User Reporting Options, such as reporting of graffiti, physical obstruction, adverse physical condition, etc. |

In the event of certain key component failures, like Bulk Note Acceptor failure or Cash Dispenser failure, the ATM may not be "out of service", but its core functionality may be compromised. In such an eventuality, instead of simply notifying the user that this service is not available, an ATM application may assess the fault condition and determine the viability of the remaining ATM services. Following the assessment of the fault condition, the thin-client mode may be presented as an option to the customer in the case that some options still work. Further, the ATM could preferably provide information on where the user's desired service is available. If no core ATM functionality is available, thin-client mode may be automatically displayed on the ATM such that only non-ATM functionality is available to the user. Such non-ATM applications made include some or all of the displayable information in Table 1.

Accordingly, a "key component failure" mode, which for the purposes of this application, may be considered one of many different types of thin-client modes, may include offering various, preferably user-selectable, services that remain viable independent of the key component failure.

Additional components and/or services that may remain active in a thin-client mode may include the following:

TABLE 2

| Thin-Client Mode Capabilities Additional active components and/or services |
|---|
| Image deposit;<br>Envelope deposit;<br>Bulk Check versus Single Check deposit;<br>Coin Dispenser;<br>Stamp Dispenser;<br>Handicap Accessible location;<br>Site versus Open Air; and/or<br>Secure-Drive up versus Walk up. |

From Table 2, it can be understood, for example, that an image deposit component may still be active in a thin-client mode. Thus, a bill dispenser may be in a failed condition, but the ATM may still be able to accept check deposits.

Furthermore, an envelope deposit, a coin dispenser, a stamp dispenser, bulk deposit and/or single check deposit, or any of the other components listed in Table 2 may be operational independent of the failure of key components. As such, a thin-client mode may still provide useful features, albeit in the absence of certain, preferably predetermined, core functionality.

In addition, certain access to an ATM may be provided while others may be in a fault condition. Thus, a particular ATM may have lost its ability to provide handicap access while maintaining an ability to provide non-handicap access, or vice versa. In other embodiments, on-site-banking access may be functional while open air access is in a fault condition. In yet other embodiments, a secure access may be functional while a non-secure access may be in a fault condition.

As stated above, in response to certain fault conditions, systems, methods and apparatus according to the invention may use an ATM or ATM network to provide travel directions to ATM users. The directions may take the form of step-by-step directions or may take the form of a map. The directions can be printed by the ATM either in full page format, in the form factor of a printed receipt or on the back of the printed receipt.

The ATM may also offer the option of concierge service—i.e., the user may be offered restaurant or hotel suggestions. After a choice has been made, directions to the user's choice may be provided by the ATM.

In yet another embodiment, the ATM may advertise on behalf of local establishments and provide directions to those locations. The ATM may simply print directions and an advertisement on the user receipt, using the back of the receipt or by adding additional length to the receipt. These features of the invention as well as others are described below in reference to FIG. 1-9.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative self-service device 100, which may be an ATM 100. ATM 100 may include housing 102. ATM 100 may include vault 104. Vault 104 may contain items (not shown). Item handling mechanism 106 may be present in vault 104. Item handling mechanism 106 may store, arrange, dispense and/or otherwise handle items for dispensing from ATM 100. For example, item handling mechanism 106 may include conveyors (not shown) for positioning and repositioning items for dispensing by dispenser 108 through item port 110. Items (not shown) in item handling mechanism 106 may be contained in item cartridges 112. For example, when the items are bills, item cartridges 112 may be cash cartridges.

Item handling mechanism 106 may include item counter 114. Item counter 114 may count items prior to dispensing by dispenser 108.

ATM 100 may include LCD display 116 and a keypad (not shown) for user interaction. Card reader 118 may be present for receiving transaction information from the user via a suitable transaction instrument. ATM 100 may include receipt printer and dispenser module 120. Receipt printer and dispenser module 120 may provide the user with a record of a transaction. CPU 120 may control user I/O, dispensing processes, which may include initialization, actuation, dispensing and any other suitable processes, receipt printing and dispensing, transaction channel communications and any other suitable processes. The transaction channel communications may be performed using modem 124, which may be any suitable communication device. Modem 124 may communicate with a local or regional network router (not shown). Service monitor 126 may be provided for a service technician to exchange information and instructions with CPU 122.

Figure 2:
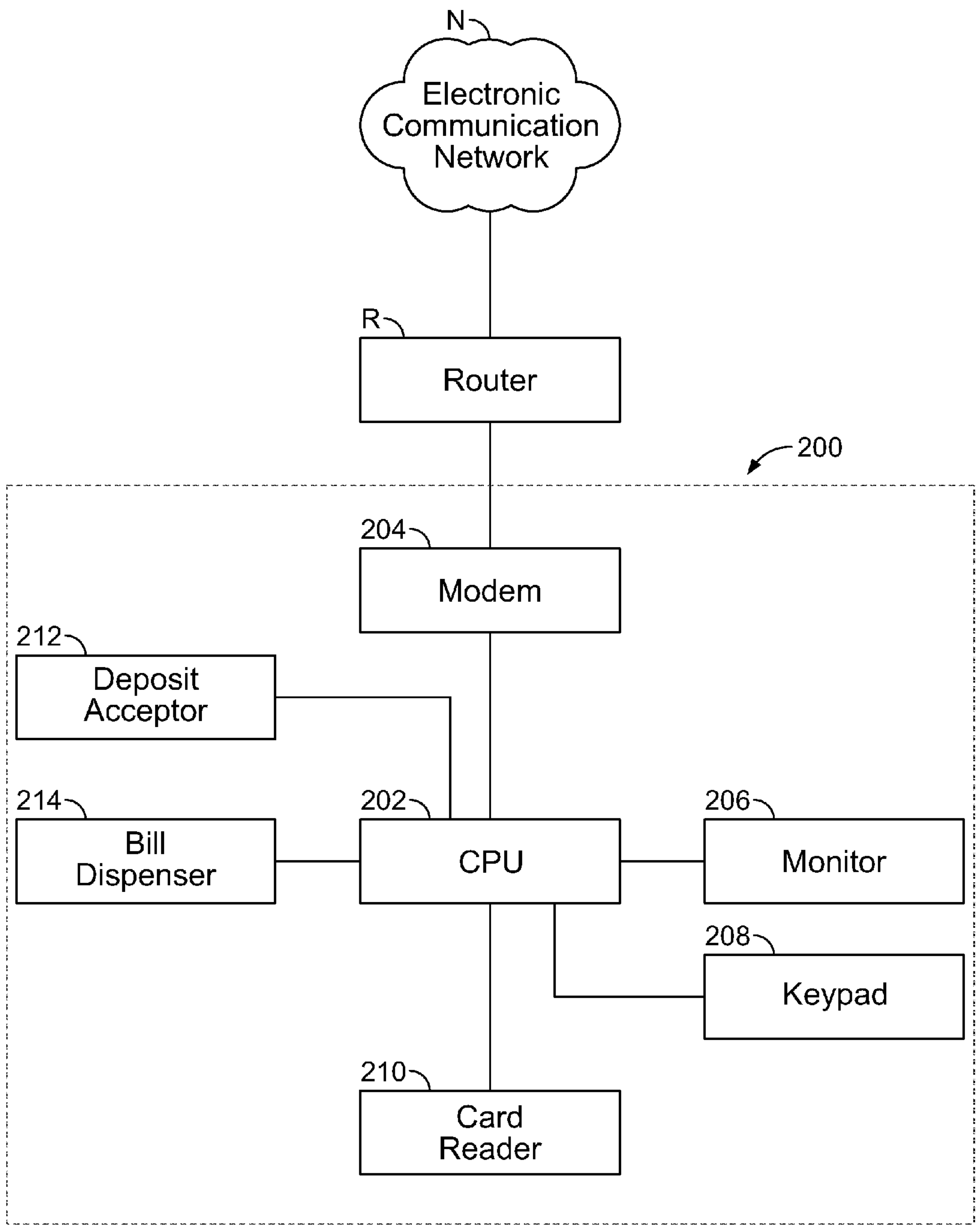
FIG. 2 shows a schematic diagram of hardware apparatus for use according to the principles of the invention.

FIG. 2 shows control system 200 for controlling an ATM such as 100 (shown in FIG. 1). System 200 is controlled by CPU 202. CPU 202 exchanges transaction information with electronic communication network N via modem 204, which is in communication with router R. CPU 202 may receive transaction information from a user via monitor 206, keypad 208, card reader 210 and deposit acceptor 212. CPU 202 may dispense bills through bill dispenser 214.

Figure 3:
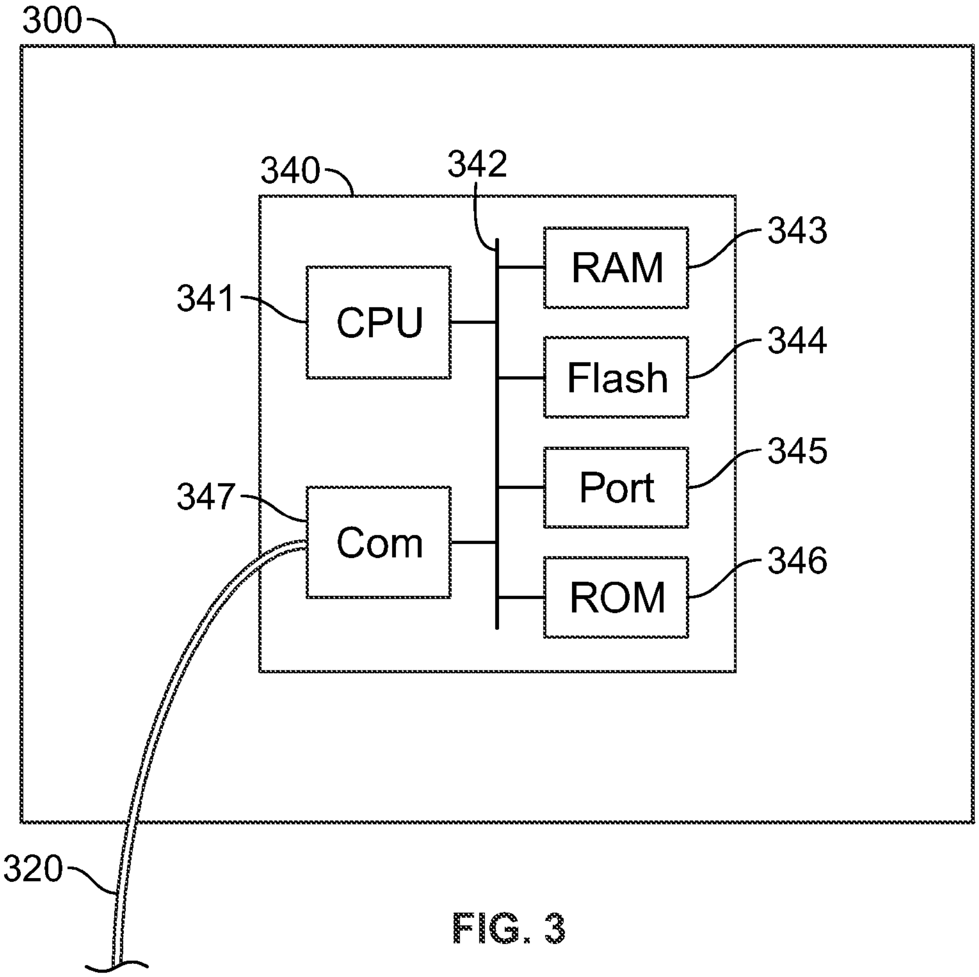
FIG. 3 shows an illustrative diagram of one embodiment of a computer subsystem of an ATM.

FIG. 3 shows an exemplary circuit board 300 which may form a portion of control system 200. Circuit board 300 may include ATM system 340. ATM system may include CPU 341, bus 342, RAM 343, flash memory 344, port 345 (for operation of apparatus such as a printer, display, keypad etc.), ROM 346, communications sub-system 347 and communications media 320. Communications sub-system 320 includes a modem such as modem 204.

Such an exemplary circuit board may be used as follows in methods and systems according to the invention. If some portion of the ATM relating to operation fails—e.g., the connection from port to the item handling mechanism (see item 106 in FIG. 1)—the CPU may still be able to communicate with the display and or the printer.

In an alternative embodiment, the item handling mechanism itself may have failed. In response to such an occurrence, or in response to any other suitable fault condition, systems and methods according to the invention may perform one or more of the following actions on the condition that certain ATM components remain viable—i.e., in a substantially non-fault condition:

TABLE 3

Actions in Response to a Failed Component—e.g., Item Handling Mechanism or Other Suitable Fault Condition

| Response to ATM Failure | Required Viable Components |
|---|---|
| Display location of nearby ATMs; Location of nearby banking centers; Location of nearby bank-affiliated retail point-of-sale terminals | CPU; at least partial use of Port (for communication with display); at least one of Flash, RAM or ROM, keypad (for entry of phone number and/or address) |
| Access phone GPS to lead user to destination | CPU; at least partial use of Port (for access to communications sub-system for GPS communication) at least one of Flash, RAM or ROM |

TABLE 3-continued

Actions in Response to a Failed Component—e.g., Item Handling Mechanism or Other Suitable Fault Condition

| Response to ATM Failure | Required Viable Components |
|---|---|
| Estimated Time for Repair of failed ATM, based at least in part on information relating to the cause for ATM failure; | CPU; partial use of Port (for communication with display); at least one of Flash, RAM or ROM and/or communications sub-system (for information regarding cause of failure) |
| Create a coverage map in relationship to where user is with respect to desired destination; | CPU; partial use of Port (for communication with display); keypad (for receiving user selection of desired location); at least one of Flash, RAM or ROM |
| Advertisements; | CPU; partial use of Port (for communication with display); at least one of Flash, RAM or ROM |
| User Reporting Options, such as reporting of Graffiti, obstruction, adverse physical condition, etc.'; and/or ATM with Key Component or Service Failure. | CPU; partial use of Port (for communication with display); at least one of Flash, RAM or ROM; keypad (for reporting) and/or communications sub-system (for information regarding cause of failure) |
| User online banking portal access | CPU; partial use of Port (for communication with display); at least one of Flash, RAM or ROM; keypad (for online banking portal navigation) and/or other internet navigation device; communications sub-system for internet connection |

It should be noted that various alternative embodiments of the items listed in Table 3 may also utilize of port 345 for communication with a printer (see, e.g., 120 in FIG. 1) in order to print directions, instructions and/or any other suitable information.

Figure 4:
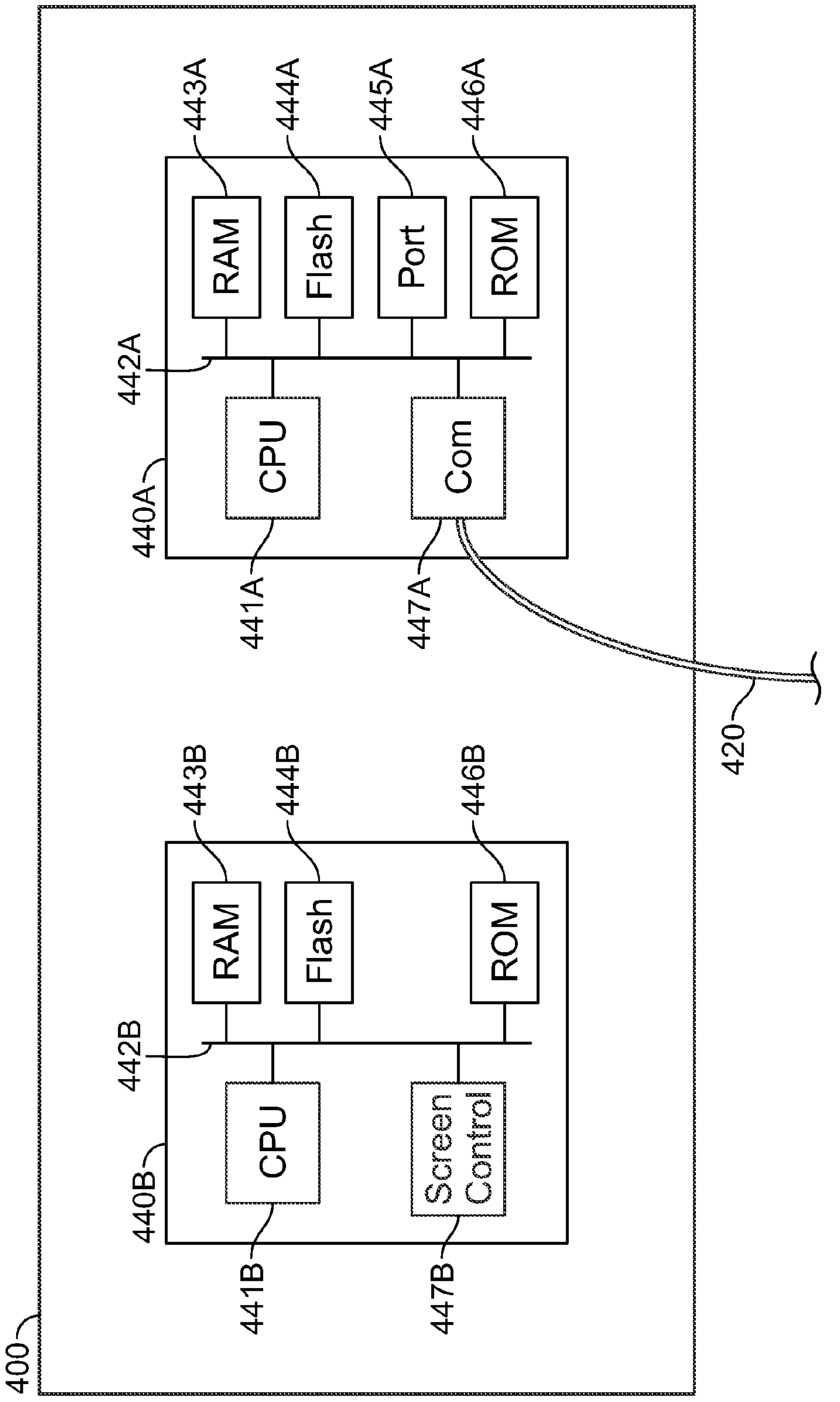
FIG. 4 shows an illustrative diagram of an embodiment of dual subsystems of an ATM.

FIG. 4 shows an alternative embodiment of an exemplary circuit board 400. Circuit board 400 may include dual ATM systems 440A and 440B for use in dual processing, as needed. ATM system 440A may include CPU 441A, bus 442A, RAM 443A, flash memory 444A, port 445A (for operation of machinery such as a printer, display, keypad etc.), ROM 446A, communications sub-system 447A and communications media 420A. ATM system 440B may include CPU 441B, bus 442B, RAM 443B, flash memory 444B, port 445B (for operation of machinery such as a printer, display, keypad etc.), ROM 446B, communications sub-system 447B and communications media 420B.

In some embodiments of the invention, system 440A may be used for typical ATM functions such as communications, cash dispensing, etc. System 440B may be an alternate system for use in response to various fault scenarios. As such, system 440B may be used in an emergency role in order to provide one or more of the functions detailed in Table 3 in response to failure of one or more aspects of the ATM. Specifically, system 440B may be used in order to provide one or more functions detailed in Table 3 in response to failure of one or more aspects of system 440A.

FIGS. 5-9 relate to various location and/or direction based aspects of an ATM according to the invention.

Figure 5:
FIG. 5 shows an illustrative diagram of one embodiment of the invention where an ATM network directs a ATM user to a known location.

FIG. 5 shows a scenario in which an embodiment of the invention may be used. A first location 501 may contain or be associated with an ATM 500. ATM 500 may provide travel directions to a user to a second location 502 as a service in response to a fault condition at ATM 500. The user may be offered the travel directions or may request the travel directions.

Figure 6:
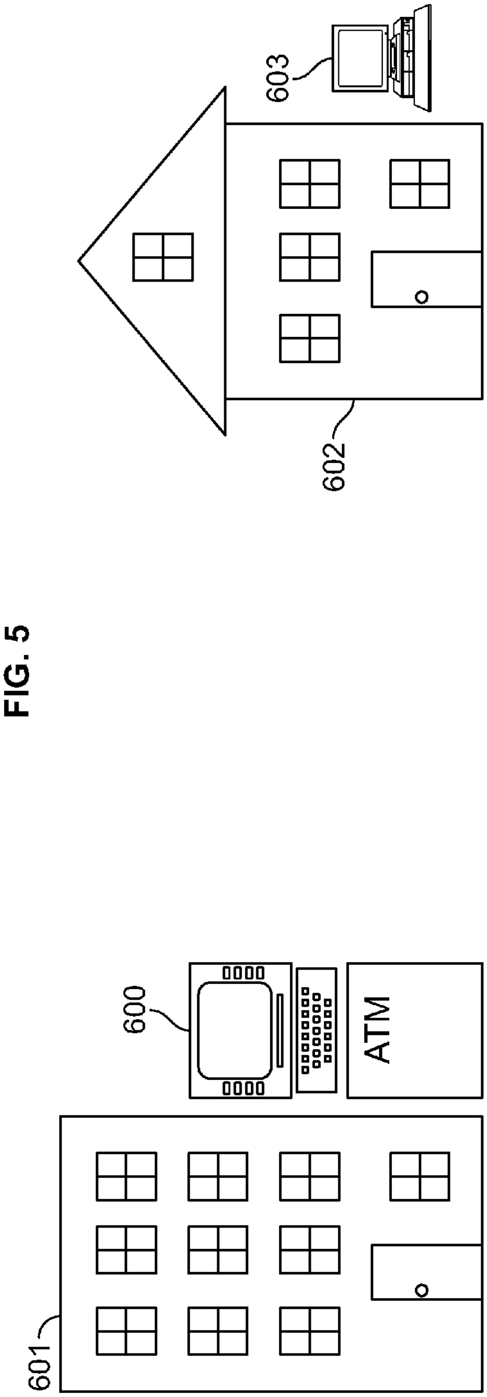
FIG. 6 shows another illustrative diagram of one embodiment of the invention where an ATM network directs a ATM user to a known location.

FIG. 6 shows another scenario in which a second embodiment of the invention may be used. A first location 601 may contain or be associated with an ATM 600. The ATM 600 or the network associated with the ATM 600 may provide travel directions to a user operating software on computer 603. The travel directions may enable the user to travel from a second location 602 to the first location 601.

Figure 7:
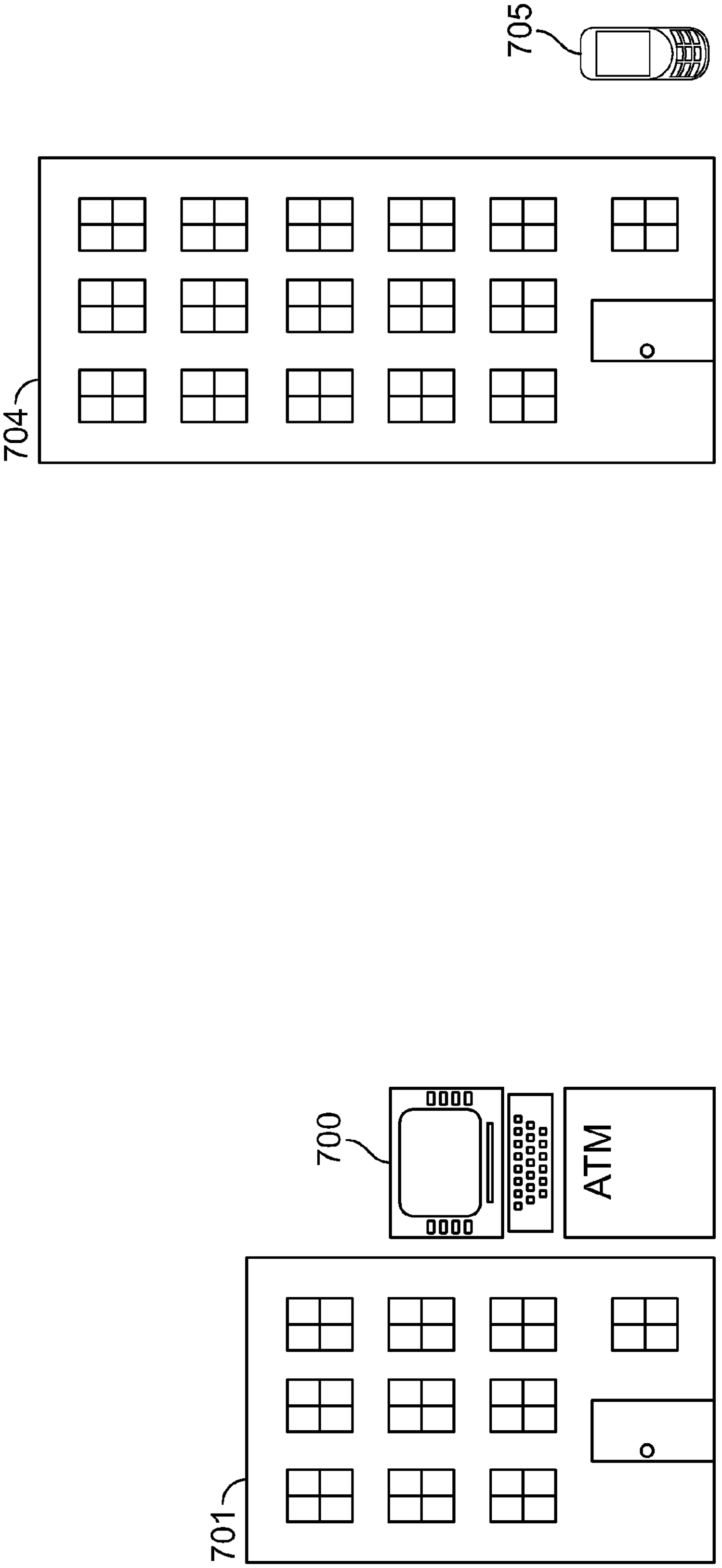
FIG. 7 shows an illustrative diagram of one embodiment of the invention where an ATM network directs an ATM user to an ATM location using a handheld device.

FIG. 7 shows yet another scenario where another embodiment of the invention may be used. A first location 701 may contain or be associated with an ATM 700. In response to an ATM fault condition, ATM 700 may be configured to provide travel directions to a user operating a handheld device 705. The travel directions may enable travel of the user from a second location 704 to the first location 701.

In certain embodiments of the invention, an address for the nearest location of a viable ATM may be transmitted by the ATM in thin-client mode to the user mobile phone. As such, the user could access the address that had been transmitted to him and could be directed to the nearest location of a viable ATM.

A more complex embodiment of the invention may involve GPS travel software (not shown) resident on the ATM which may be augmented to allow the ATM 700 (or the network associated with ATM 700) to direct the user step-by-step. The directions may be used to locate the nearest viable ATM or a desired ATM location.

The location of the user handheld communication device can be determined from the device's network provider as is now commonly done for 911 services. In the alternative the handheld device may access a Global Positioning Satellite (GPS) location obtained by the handheld device. Once the location of the user is known, travel directions may be provided to the user on the screen of the handheld device.

Figure 8:
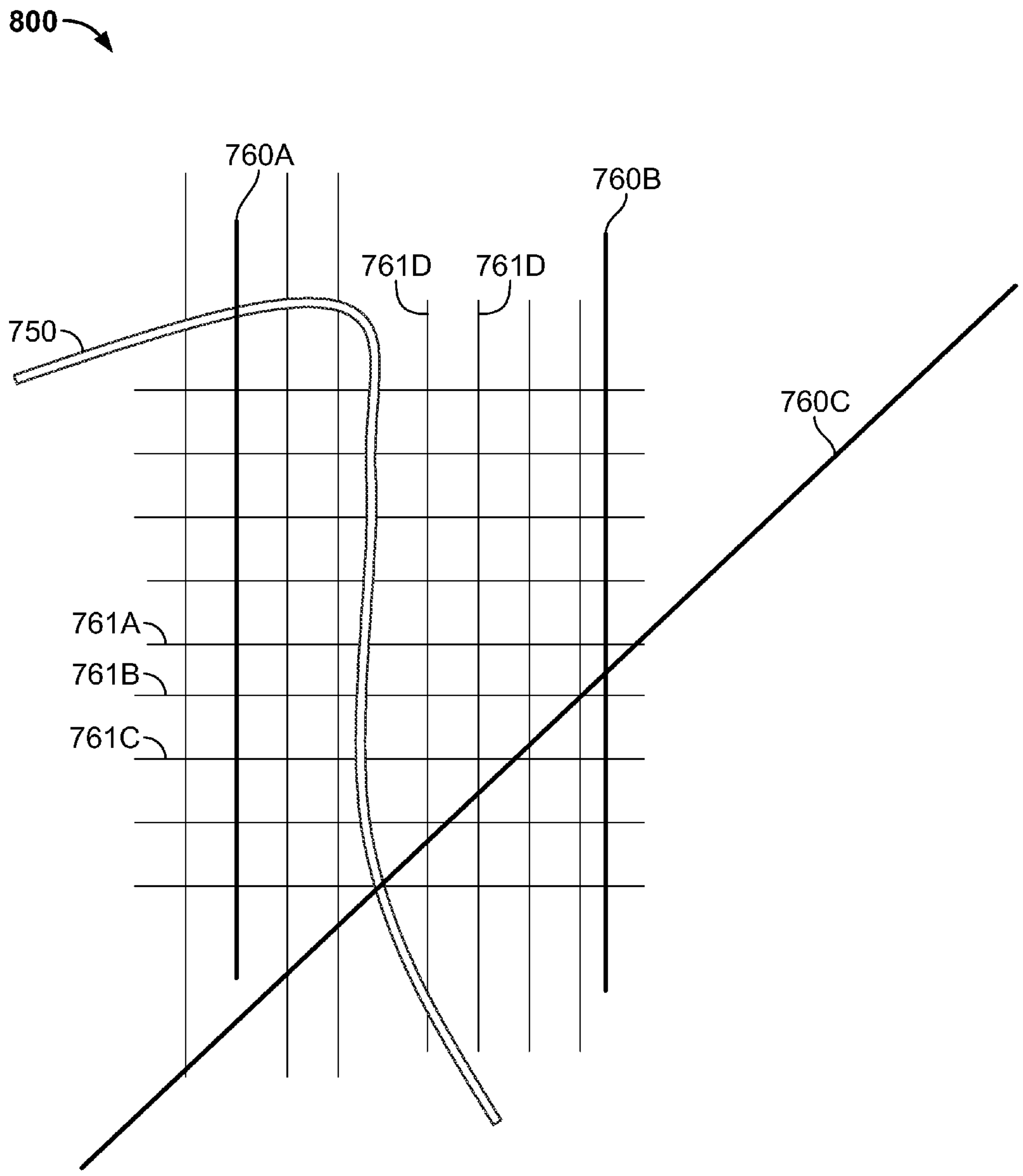
FIG. 8 shows an illustrative diagram of one embodiment of a map showing "coverage" of various ATM locations.

FIG. 8 shows an illustrative diagram 800 of one embodiment of a map showing "coverage" of various ATM locations. Diagram 800 may include route indicator 850, major thoroughfare indicator 860A, 860B and 860C, vertical road indicators 861D, and horizontal road indicators 861A-C.

Illustrative diagram 800 may be displayed on an ATM display or, in some embodiments, may be printed on a map so a user may take the map with him or her in order to guide them to the closest ATM or other suitable destination. Such a diagram may also be displayed and/or printed in response to a user selection, as described in greater detail with respect to FIG. 9.

Figure 9:
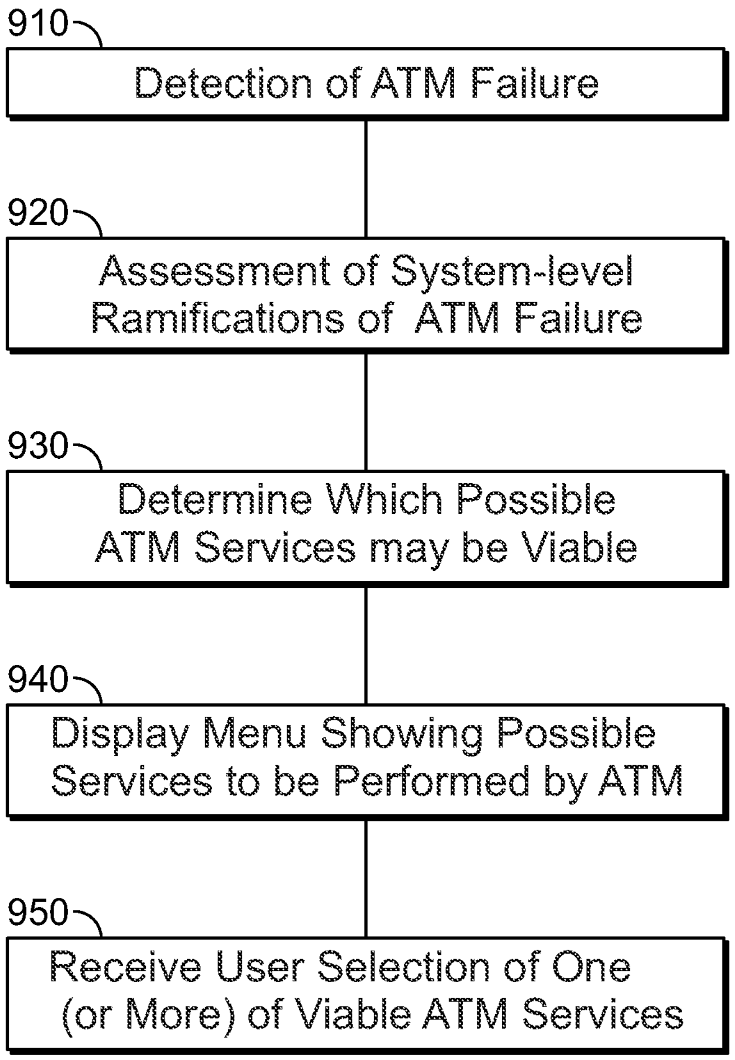
FIG. 9 shows an illustrative flow diagram of a post-failure assessment of an ATM failure.

Following detection of an ATM failure, a module within circuit board 340, 440A and/or 440B may be dedicated to assessing the non-failed aspects of the ATM. FIG. 9 shows a flow chart of possible steps taken by such an assessment module. In embodiments relating to FIG. 3, the assessment module may be co-located with CPU 340. In embodiments related to FIG. 4, the assessment module may be co-located with either, or both, of CPUs 440A and 440B. It should be noted that the assessment module may obtain information regarding the fault condition of the ATM either directly from the ATM and/or from a remote input—e.g., from a remote web server that has received information regarding the fault condition of the invention in which the assessment module is located.

Step 910 shows detection of an ATM failure. Step 920 shows assessment of the system-level ramifications of the ATM failure—e.g., which components are implicated by the failure. Step 930 shows determination of which of the possible actions listed above in Table 3, for example, may be available.

In certain embodiments of the invention, such information as determined by step 930 may be displayed in a menu, as shown in step 940. In response to a display of the menu, a user may select one or more of the remaining ATM actions, as shown in step 950.

Certain embodiments of the invention may also be configured to display a coverage map of fully operational ATMs on a portion of a user internet portal such as a user banking portal. In such embodiments, a user may be able to check his or her portal before traveling to an ATM. Such embodiments may preferably save user time and prevent user frustration directed at broken ATM machines.

Figure 10:
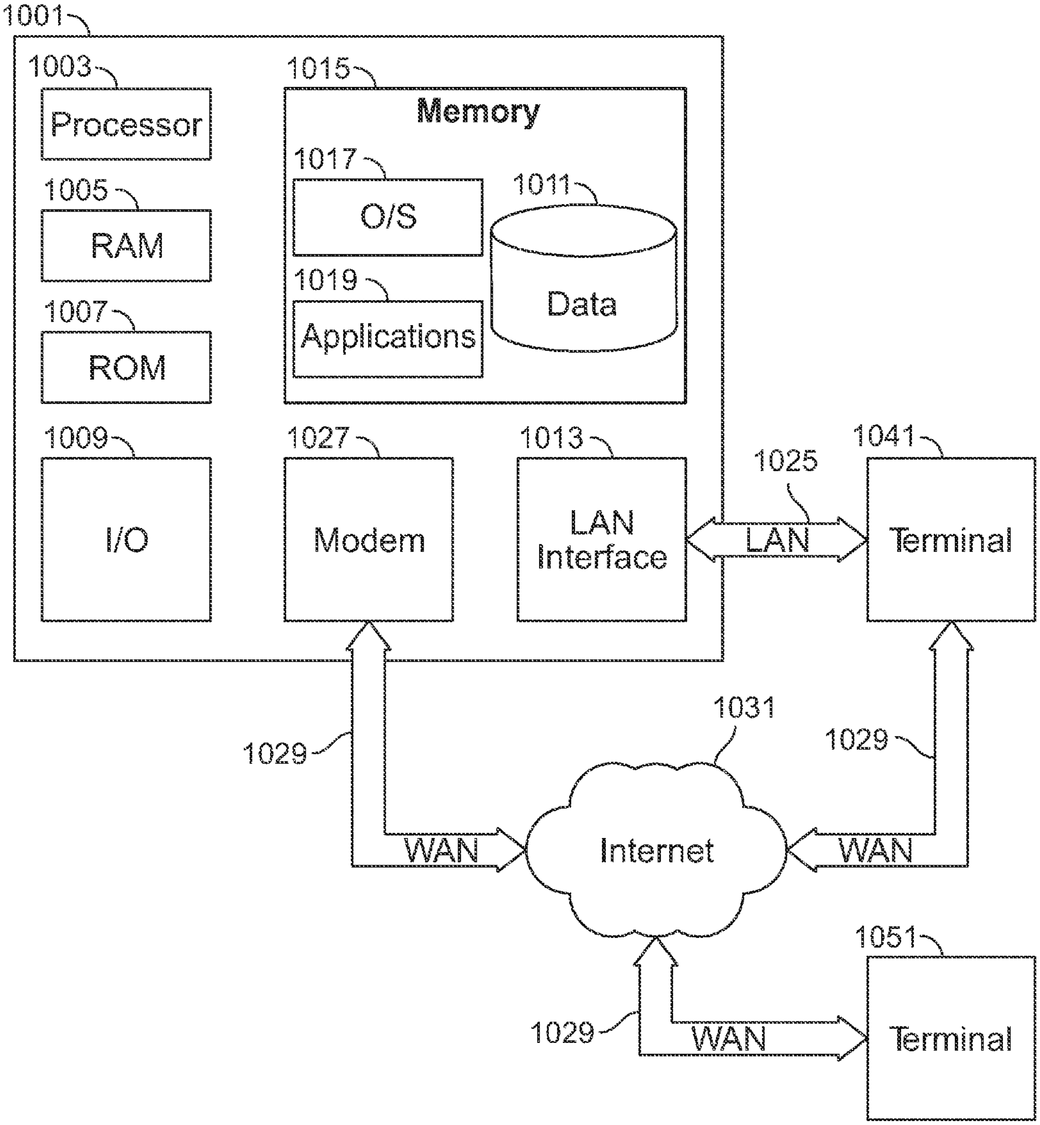
FIG. 10 is a block diagram that illustrates a generic computing device 1001 that may be used according to an illustrative embodiment of the invention.

FIG. 10 is a block diagram that illustrates a generic computing device 1001 that may be used according to an illustrative embodiment of the invention. The computer server 1001 may have a processor 1003 for controlling overall operation of the server and its associated components, including RAM 1005, ROM 1007, input/output module 1009, and memory 1025. Server 1001 may include one or more receiver modules, server modules and processors that may be configured to transmit and receive transaction information, regarding adaptive diagnostics regarding ATM fault conditions. Such adaptive diagnostics may include assessing an ATM fault condition(s) and/or providing possible user-selectable services in view of the ATM fault conditions.

Input/output ("I/O") module 1009 may include a microphone, keypad, touch screen, and/or stylus through which a user of device 1001 may provide input, and may also include one or more of a speaker for providing audio output and a video display device for providing textual, audiovisual and/or graphical output. Software may be stored within memory 1025 and/or storage to provide instructions to processor 1003 for enabling server 1001 to perform various functions. For example, memory 1025 may store software used by server 1001, such as an operating system 1017, application programs 1019, and an associated database 1021. Alternatively, some or all of server 1001 computer executable instructions may be embodied in hardware or firmware (not shown). As described in detail below, database 1021 may provide storage for fault conditions, possible viable alternative applications that may be implemented in response to selected fault conditions and any other suitable information.

Server 1001 may operate in a networked environment supporting connections to one or more remote computers, such as terminals 1041 and 1051. Terminals 1041 and 1051 may be personal computers or servers that include many or all of the elements described above relative to server 1001. The network connections depicted in FIG. 10 include a local area network (LAN) 1025 and a wide area network (WAN) 1029, but may also include other networks. When used in a LAN networking environment, computer 1001 is connected to LAN 1025 through a network interface or adapter 1023. When used in a WAN networking environment, server 1001 may include a modem 1027 or other means for establishing communications over WAN 1029, such as Internet 1031. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 1019, which may be used by server 1001, may include computer executable instructions for invoking user functionality related to communication, such as email, short message service (SMS), and voice input and speech recognition applications.

Computing device 1001 and/or terminals 1041 or 1051 may also be mobile terminals including various other components, such as a battery, speaker, and antennas (not shown).

Terminal 1051 and/or terminal 1041 may be portable devices such as a laptop, cell phone, blackberry, or any other suitable device for storing, transmitting and/or transporting relevant information.

Any information described above in connection with database 1021, and any other suitable information, may be stored in memory 1025.

One or more of applications 1019 may include one or more algorithms that may be used to perform adaptive diagnostics for ATM fault conditions.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Thus, methods and apparatus for utilization of adaptive diagnostics for ATM fault conditions, as well as other information, have been provided. Persons skilled in the art will appreciate that the present invention can be practiced by other than the described embodiments, which are presented for purposes of illustration rather than of limitation, and that the present invention is limited only by the claims that follow.

What is claimed is:

1. An automated teller machine ("ATM") comprising:

a receiver module configured to receive an input from an ATM component, the input including information regarding a fault-related event;

a computational module configured to assess a plurality of system-level ramifications of the fault-related event and to determine continued viability of a plurality of ATM services; and a transmission module configured to:

send an electronic notification that the ATM is affected by a fault-related event, the notification to be stored in a central server, said stored notification configured for use in displaying a display on a user internet banking portal, said display that corresponds to said notification;

send an electronic notification of a list of remaining viable ATM services;

wherein the ATM is further configured to display:

a coverage map that shows the most proximal fully-operational ATM, said fully-operational ATM unaffected by the fault-related event; and a selectable field for providing access to a web page served by a web server remote from the ATM, the web page providing secure customer access to an internet banking portal.

2. The machine of claim 1 wherein the plurality of system-level ramifications includes disablement of a computer processing unit ("CPU").

3. The machine of claim 1 wherein the plurality of system-level ramifications includes disablement of a communications port.

4. The machine of claim 1 wherein the plurality of system-level ramifications includes disablement of one of flash memory, RAM and ROM.

5. The machine of claim 1 wherein the plurality of system-level ramifications includes disablement of an ATM keypad.

6. The machine of claim 1 wherein the ATM is configured to display the list of remaining viable ATM services.

7. The machine of claim 1 wherein the plurality of ATM services includes at least one of display of: location of a proximal ATM; estimated time for repair of ATM; and display of a plurality of user reporting options.

8. One or more computer-readable media storing computer-executable instructions which, when executed by a processor on a computer system, perform a method for diagnosing an automated teller machine ("ATM") fault condition, the method comprising:

receiving an input from an ATM component, the input including information regarding a fault-related event;

assessing a plurality of system-level ramifications of the fault-related event; and in response to the assessing;

determining continued viability of a plurality of ATM services; and electronically providing:

a notification of a list of remaining viable ATM services;

a notification that the ATM is affected by a fault-related event, the notification to be stored in a central server, the stored notification configured for display on a user internet banking portal;

an ATM display of a coverage map that shows the location of the most proximal fully operational ATM, said fully operational ATM unaffected by a fault-related event; and an ATM display of a web page served by a web server remote from the ATM, the web page providing customer access to an online banking portal.

9. The method of claim 8 further comprising receiving information including disablement of a computer processing unit ("CPU").

10. The method of claim 8 further comprising receiving information including disablement of a communications port.

11. The method of claim 8 further comprising receiving information including disablement of one of flash memory, RAM and ROM.

12. The method of claim 8 further comprising receiving information including disablement of an ATM keypad.

13. The method of claim 8 further comprising displaying a list of remaining viable ATM services.

14. The method of claim 8 further comprising displaying at least one of:

a location of a proximal ATM;

an estimated time for repair of ATM; and a display of a plurality of user reporting options.

* * * * *